United States Patent
Qin et al.

(10) Patent No.: US 12,362,692 B2
(45) Date of Patent: Jul. 15, 2025

(54) BLDC MOTOR SYSTEM WITH REDUCED POWER LOSS AND THE INITIAL ROTATION DIRECTION JUDGING METHOD THEREOF

(71) Applicant: Chengdu Monolithic Power Systems Co., Ltd., Chengdu (CN)

(72) Inventors: Hongqiang Qin, Hangzhou (CN); Yishan Ma, Hangzhou (CN); Qiming Zhao, Hangzhou (CN); Licheng Sheng, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 189 days.

(21) Appl. No.: 18/194,768

(22) Filed: Apr. 3, 2023

(65) Prior Publication Data

US 2023/0318495 A1 Oct. 5, 2023

(30) Foreign Application Priority Data

Apr. 2, 2022 (CN) .......................... 202210363021.4

(51) Int. Cl.
*G01D 5/14* (2006.01)
*H02K 11/215* (2016.01)
*H02P 6/182* (2016.01)
*H02P 6/20* (2016.01)

(52) U.S. Cl.
CPC ............ *H02P 6/182* (2013.01); *H02K 11/215* (2016.01); *H02P 6/20* (2013.01)

(58) Field of Classification Search
CPC ... H02P 6/182; H02P 6/20; H02P 6/16; H02K 11/215; G01D 5/145
See application file for complete search history.

(56) References Cited

U.S. PATENT DOCUMENTS

| | | | |
|---|---|---|---|
| 9,917,539 B1 * | 3/2018 | Omura | ........................ H02P 6/16 |
| 2012/0062159 A1 | 3/2012 | Li et al. | |
| 2012/0274247 A1 | 11/2012 | Zhao et al. | |
| 2016/0087559 A1 * | 3/2016 | Lin | ........................ G01D 5/145 |
| | | | 324/207.2 |
| 2020/0067440 A1 | 2/2020 | Zhao et al. | |
| 2021/0050849 A1 | 2/2021 | Zhang | |

* cited by examiner

*Primary Examiner* — Cortez M Cook
(74) *Attorney, Agent, or Firm* — Perkins Coie LLP (57) ABSTRACT

A BLDC motor system having a power stage, a hall sensor and a logical control circuit is discussed. The BLDC motor system improves performances by judging an initial rotation direction through the back electromotive force generated by the stator together with the induced signal sensed by the hall sensor.

20 Claims, 5 Drawing Sheets

BLDC MOTOR SYSTEM WITH REDUCED POWER LOSS AND THE INITIAL ROTATION DIRECTION JUDGING METHOD THEREOF

CROSS-REFERENCE TO RELATED APPLICATIONS

This application claims priority to and the benefit of Chinese Patent Application No. 202210363021.4, filed Apr. 2, 2022, which is incorporated herein by reference in its entirety.

BACKGROUND OF THE INVENTION

Brushless DC (BLDC) motors are characterized by low noise, high efficiency, long lifetime, and high stability because no brush and commutator is needed. Thus, they are widely used in industrial fans, house appliances, pumps, and etc. At the power on process or startup of the motor, typically the rotor has a certain rotation speed due to environmental disturbances. A detection of the rotation direction is needed to ensure safe operation.

Figure 1:
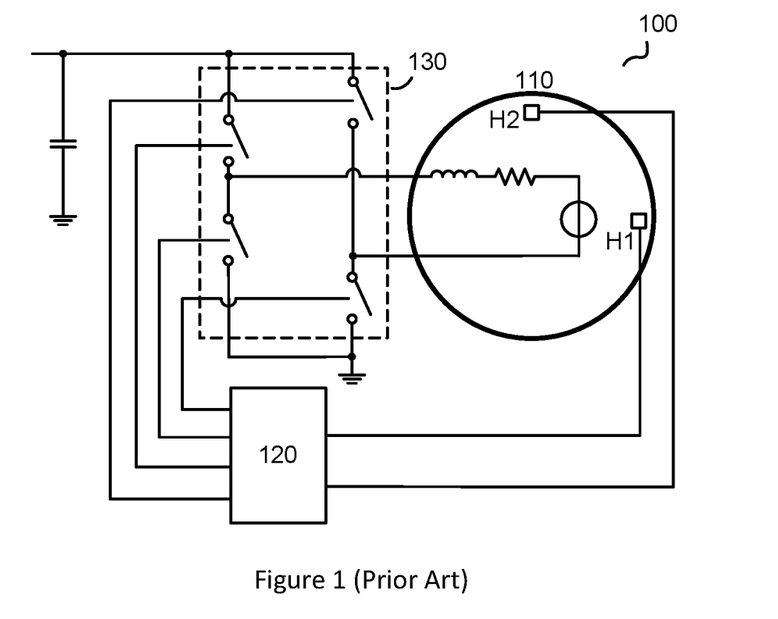
FIG. 1 schematically shows a prior BLDC motor system 100 in the prior art.

Prior art uses two hall sensors to detect the original direction of the rotation. As shown in FIG. 1, a prior BLDC motor system 100 is schematically shown. The BLDC motor system 100 has a first hall sensor H1 and a second hall sensor H2 placed with a certain phase difference, to sense an original rotation direction of a rotor 110 at the startup of the system. The sensed information from the first hall sensor H1 and the second hall sensor H2 is delivered to a logical control circuit 120, to perform phase analysis and to obtain the information of the original rotation direction. Then the logical control circuit 120 chooses a start logic (e.g., forward rotate logic, or reverse rotate logic), to control a power stage 130.

However, the usage of two hall sensors brings complicated wiring and high cost.

SUMMARY OF THE INVENTION

In accordance with an embodiment of the present invention, a brushless DC motor system is discussed. The BLDC motor system comprises: a power stage, a hall sensor and a logical control circuit. The power stage is configured to receive an input voltage, to convert the input voltage to an energy required by a motor. The motor has a rotor and a stator. The hall sensor is configured to sense a variation of a magnetic field caused by a rotation of the rotor, to generate a sense signal. The logical control circuit comprises: a comparing circuit, a phase detector and a logic unit. The comparing circuit is configured to compare a reference voltage with a feedback voltage indicative of a back electromotive force across the stator, to generate a compare signal. The phase detector is configured to detect an overlap degree between the sense signal and the compare signal, to generate an initial rotation signal. The logic unit is configured to choose a forward rotation logic or a reverse rotation logic in response to the initial rotation signal, to control the operation of the power stage.

In addition, in accordance with an embodiment of the present invention, an initial rotation direction judging method used in a brushless DC motor system is discussed. The motor has a rotor and a stator. The method comprises: sensing a variation of a magnetic field caused by a rotation of the rotor, to generate a sense signal; comparing a back electromotive force across the stator with a reference voltage, to generate a compare signal; detecting an overlap degree between the sense signal and the compare signal, to generate an initial rotation signal; and choosing a forward startup logic or a reverse startup logic in response to the initial rotation signal.

Furthermore, in accordance with an embodiment of the present invention, a logical control circuit used in a brushless DC motor system is discussed. The motor system has a power stage converting an input voltage to an output voltage, and a hall sensor configured to generate a sense signal by sensing a variation of a magnetic field caused by a rotation of a rotor. The logical control circuit comprises: a comparing circuit, configured to compare a reference voltage with a feedback voltage indicative of a back electromotive force across a stator, to generate a compare signal; a phase detector, configured to detect an overlap degree between the sense signal and the compare signal, to generate an initial rotation signal; and a logic unit, configured to choose a forward rotation logic or a reverse rotation logic in response to the initial rotation signal, to control the operation of the power stage.

DETAILED DESCRIPTION OF THE INVENTION

Embodiments of circuits for brushless DC motor are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 2:
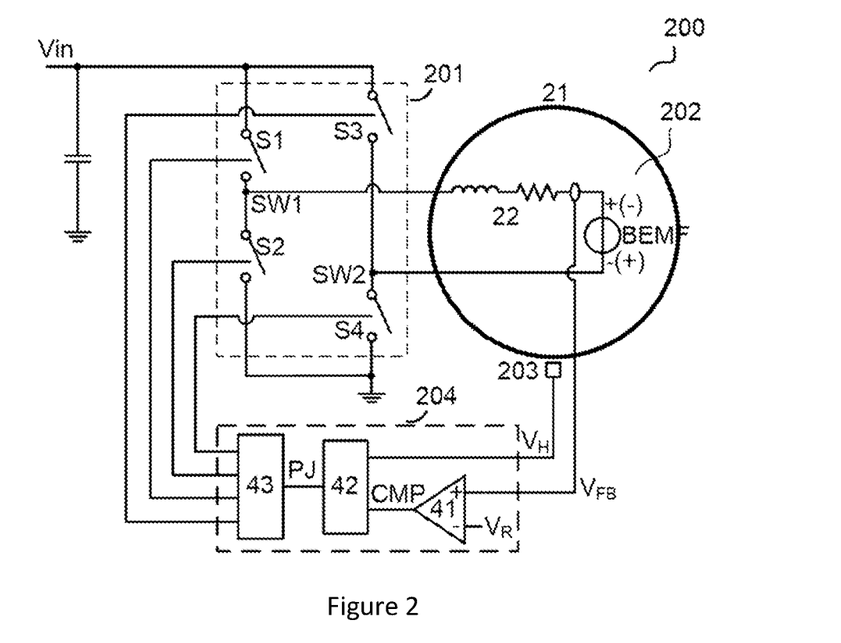
FIG. 2 schematically shows a BLDC motor system 200 in accordance with an embodiment of the present invention.

FIG. 2 schematically shows a BLDC motor system 200 in accordance with an embodiment of the present invention. In the example of FIG. 2, the BLDC motor system 200 comprises: a power stage 201, configured to receive an input voltage Vin. The power stage 201 having power switches periodically turned on and off, to convert the input voltage Vin to an energy required by a motor 202. The motor 202 has a rotor 21 and a stator 22. The BLDC motor system 200 further comprises a hall sensor 203 and a logical control circuit 204. The hall sensor 203 is configured to sense a variation of a magnetic field caused by a rotation of the rotor 21, to generate a sense signal $V_H$. The logical control circuit 204 comprises: a comparing circuit 41, configured to compare a reference voltage VR with a feedback voltage $V_{FB}$ indicative of a back electromotive force (BEMF) across the stator 22, to generate a compare signal CMP; a phase detector 42, configured to detect an overlap degree between the sense signal $V_H$ and the compare signal CMP, to generate an initial rotation signal Pi; and a logic unit 43, configured to choose a forward rotation logic or a reverse rotation logic in response to the initial rotation signal Pi, to control the operation of the power stage 201.

In one embodiment of the present invention, the overlap degree between the sense signal $V_H$ and the compare signal CMP indicates an in-phase degree between the two signals.

The term "in-phase" may refer to a condition when the two signals are both in high level or both in low level, i.e., the two signals have the same phase. The term "in-phase degree" may refer to a ratio of a time period that the two signals have the same level to half of an electrical cycle. If the sense signal $V_H$ and the compare signal CMP are fully in the same phase, i.e., their falling edges and rising edges align with each other, the in-phase degree is 100%. If the sense signal $V_H$ and the compare signal CMP are fully out of the phase, i.e., the falling edge of one signal between the sense signal $V_H$ and the compare signal CMP just aligns with the rising edge of the other signal between the sense signal $V_H$ and the compare signal CMP, the in-phase degree is 0%. If the sense signal $V_H$ and the compare signal CMP have overlap with each other, the in-phase degree is between 0%-100%. In one embodiment of the present invention, the electrical cycle may refer to a cycle of the sense signal $V_H$ generated by the hall sensor, i.e., the time that the sense signal $V_H$ varies in one cycle.

In one embodiment of the present invention, if the in-phase degree of the sense signal $V_H$ and the compare signal CMP is relatively high, the motor has an initial forward rotation. On the contrary, if the in-phase degree of the sense signal $V_H$ and the compare signal CMP is relatively low, the motor has an initial reverse rotation.

In one embodiment of the present invention, the initial rotation refers to a natural rotation caused by environmental factors (e.g., a natural wind, or a rotation from a nearby fan).

In one embodiment of the present invention, the power stage 201 comprises a full bridge circuit. Specifically, the power stage 201 comprises: a first switch S1 and a second switch S2, series coupled between the input voltage Vin and a reference ground; and a third switch S3 and a fourth switch S4, series coupled between the input voltage Vin and the reference ground. The motor 202 is coupled between a first switch node SW1 and a second switch node SW2. The first switch node SW1 is formed by a common connection of the first switch S1 and the second switch S2. The second switch node SW2 is formed by a common connection of the third switch S3 and the fourth switch S4. During normal operation of the system, when the hall sense signal $V_H$ indicates the magnetic field is positive, the first switch S1 and the second switch S2 are turned on alternatively, while the third switch S3 maintains to be OFF and the fourth switch S4 maintains to be ON. When the hall sense signal $V_H$ indicates the magnetic field is negative, the third switch S3 and the fourth switch S4 are turned on alternatively, while the first switch S1 maintains to be OFF and the second switch S2 maintains to be ON. Then, an output voltage is generated between the first switch node SW1 and the second switch node SW2.

Figure 3:
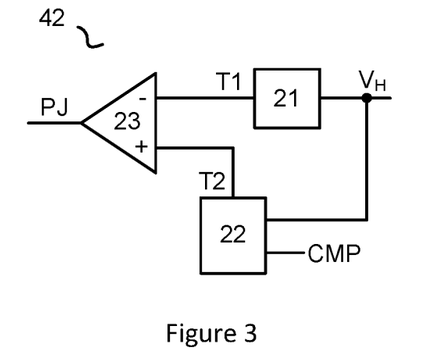
FIG. 3 schematically shows a circuit configuration of the phase detector 42 in accordance with an embodiment of the present invention.

FIG. 3 schematically shows a circuit configuration of the phase detector 42 in accordance with an embodiment of the present invention. In the example of FIG. 3, the phase detector 42 comprises: a first timer 21, a second timer 22 and a comparing unit 23. The first timer 21 is configured to time a time period of a high level of the sense signal $V_H$ in one electrical cycle, to generate a first time signal T1. The second timer 22 is configured to time a time period of a high level of the compare signal CMP when the sense signal $V_H$ is high, to generate a second time signal T2. The comparing unit 23 is configured to compare the first time signal T1 with the second time signal T2, to generate the initial rotation signal Pi. In another embodiment of the present invention, the first timer 21 may be configured to time a time period of a low level of the sense signal $V_H$ in one electrical cycle, to generate the first time signal T1; and the second timer 22 may be configured to time a time period of a low level of the compare signal CMP when the sense signal $V_H$ is low, to generate the second time signal T2.

In one embodiment of the present invention, if the motor has an initial forward rotation direction, the sense signal $V_H$ and the compare signal CMP would be in the same phase. Theoretically, if the hall sensor 203 is mounted at a place right in line with the back electromotive force across the stator 22, the high level (or the low level) of the sense signal $V_H$ would have a same time period as the high level (or the low level) of the compare signal CMP, that is, T1=T2. If the motor has an initial reverse rotation direction, the sense signal $V_H$ is complementary to the compare signal CMP. Then T2=0, and T2<T1.

In real applications, the hall sensor 203 is typically mounted at a place shifted with the motor with a certain angle, e.g., with 15 degrees. Thus, if the motor has an initial forward rotation direction, the sense signal $V_H$ and the compare signal CMP would be in the same phase, but are shifted with each other with some phase; and if the motor has an initial reverse rotation direction, the sense signal $V_H$ and the compare signal CMP would be in the same phase within the shifted phase, and are out of phase with each other in the remained phase. Thus, the second time signal T2 may be compared with the first time signal T1 multiplied with a coefficient k, as shown in FIG. 4, which schematically shows a circuit configuration of a phase detector 42-1.

Figure 4:
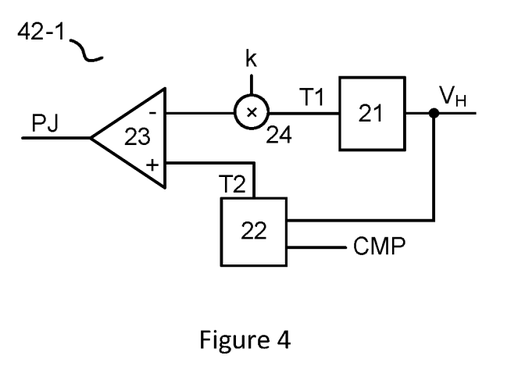
FIG. 4 schematically shows a circuit configuration of a phase detector 42-1 in accordance with an embodiment of the present invention.

The phase detector 42-1 shown in FIG. 4 is similar as the phase detector 42 in FIG. 3, with a difference that in the example of FIG. 4, the phase detector 42-1 further comprises: a multiplying unit 24, configured to perform a multiplication operation on the first time signal T1 and the coefficient k. The result of the multiplication is then compared with the second time signal T2 at the comparing unit 23.

Figure 5:
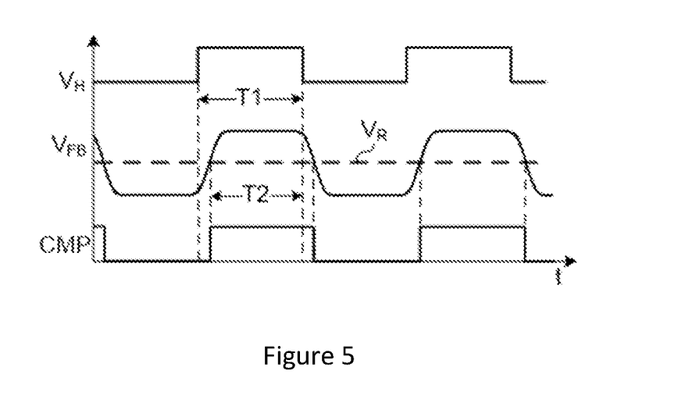
FIG. 5 schematically shows timing waveforms of the sense signal $V_H$, the feedback voltage $V_{FB}$ and the compare signal CMP when the motor has an initial forward rotation in accordance with an embodiment of the present invention.
Figure 6:
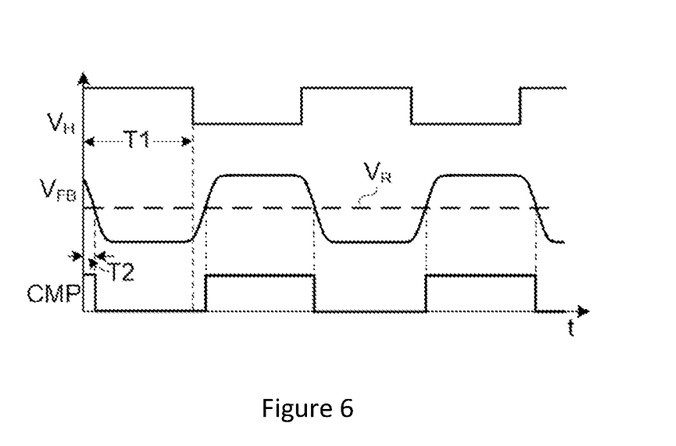
FIG. 6 schematically shows timing waveforms of the sense signal $V_H$, the feedback voltage $V_{FB}$ and the compare signal CMP when the motor has an initial reverse rotation in accordance with an embodiment of the present invention.

If T2 is higher than the result of the multiplication (i.e., T2>T1×K), the motor has an initial forward rotation direction (as shown in FIG. 5). On the contrary, if T2 is lower than the result of the multiplication (i.e., T2<T1×K), the motor has an initial reverse rotation direction (as shown in FIG. 6). Accordingly, the comparing unit 23 generates the initial rotation signal Pi, to have the logical unit 43 choose the corresponding start logic (i.e., the forward startup logic or the reverse startup logic), to control the operation of the power stage 201.

One skilled in the art may choose appropriate value of k in real applications. In one embodiment of the present invention, k=0.75.

In the foregoing embodiments shown in FIG. 3 and FIG. 4, the time period of the high level (or low level) of the sense signal $V_H$ in one electrical cycle is timed first, and then the time period of the corresponding level of the compare signal CM P is timed at the high level duration (or low level duration) of the sense signal $V_H$. However, one skilled in the art should realize that, the time period of the high level (or low level) of the compare signal CMP may be timed first, and then the time period of the corresponding level of the sense signal $V_H$ is timed at the high level duration (or low level duration) of the compare signal CMP, as shown in FIG. 7.

Figure 7:
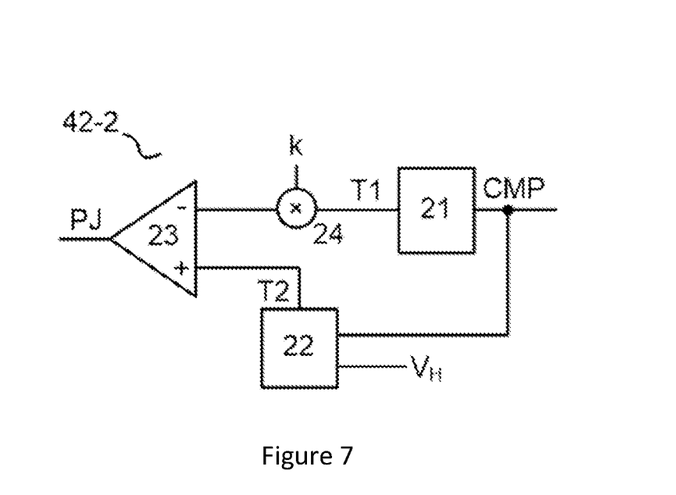
FIG. 7 schematically shows a circuit configuration of a phase detector 42-2 in accordance with an embodiment of the present invention.

FIG. 7 schematically shows a circuit configuration of a phase detector 42-2 in accordance with an embodiment of the present invention. In the example of FIG. 7, the phase detector 42-2 comprises: a first timer 21, a second timer 22 and a comparator 23. The first timer 21 is configured to time a time period of a high (and/or low) level of the compare signal CMP in one electrical cycle, to generate a first time signal T1. The second timer 22 is configured to time a time period of a high (and/or low) level of the sense signal $V_H$ when the compare signal CM P is high (and/or low), to generate a second time signal T2. The phase detector 42-2 may also further comprise a multiplying unit 24, configured to perform a multiplication operation on the first time signal T1 and the coefficient k. Then, the result of the multiplication is compared with the second time signal T2 at the comparing unit 23.

That is, the phase detector comprises: a first timer 21, a second timer 22 and a comparing unit 23. The first timer 21 is configured to time a time period of a high level or a low level of one signal between the sense signal $V_H$ and the compare signal CMP in one electrical cycle, to generate a first time signal T1. The second timer 22 is configured to time a time period of the high level or the low level of the other signal between the sense signal $V_H$ and the compare signal CMP during the timing period of the first timer 21, to generate a second time signal T2. The comparing unit 23 is configured to compare the first time signal T1 (or the multiplication of the first time signal T1 and the coefficient k) with the second time signal T2, to generate the initial rotation signal Pi.

Figure 8:
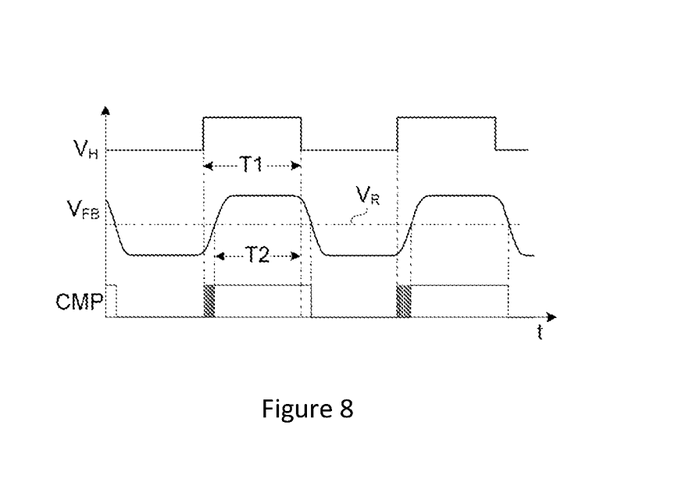
FIG. 8 schematically shows real timing waveforms of the sense signal $V_H$, the feedback voltage $V_{FB}$ and the compare signal CMP due to the existence of disturbance when the motor has an initial forward rotation in accordance with an embodiment of the present invention.

In real applications, because the motor has a relatively low initial rotation speed, the back electromotive force across the stator 22 is relatively low. Accordingly, disturbance may occur at the feedback voltage $V_{FB}$ when the sense signal $V_H$ turns high, causing the compare signal CMP to have certain short pulses during the sense signal $V_H$'s edge jump, as shown in FIG. 8.

Therefore, the second time signal T2 may be compared with the first time signal T1 (or the multiplication of the first time signal T1 and the coefficient k) for several times, to improve the detection accuracy. For example, the second time signal T2 may be compared with the first time signal T1 (or the multiplication of the first time signal T1 and the coefficient k) for consecutive n (e.g., 2, 3 or more) electrical cycles. During these n electrical cycles, if a number of times that the second time signal T2 is higher than the first time signal T1 (or the multiplication of the first time signal T1 and the coefficient k) reaches a set value, the motor has an initial forward rotation; and if the number of times that the second time signal T2 is higher than the first time signal T1 (or the multiplication of the first time signal T1 and the coefficient k) is less than the set value, the motor has an initial reverse rotation.

Figure 9:
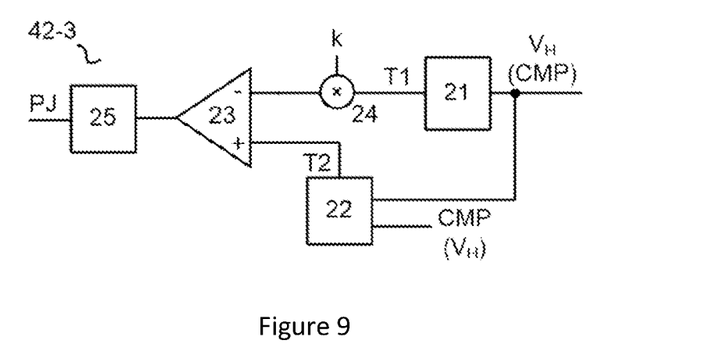
FIG. 9 schematically shows a circuit configuration of a phase detector 42-3 in accordance with an embodiment of the present invention.

FIG. 9 schematically shows a phase detector 42-3 in accordance with an embodiment of the present invention. The phase detector 42-3 is similar as the phase detector 42-1 in FIG. 4, with a difference that in the example of FIG. 9, the phase detector 42-3 further comprises: a counting circuit 25, configured to start counting in response to a comparison result of the second time signal T2 with the first time signal T1 (or the multiplication of the first time signal T1 and the coefficient k). When the counting number reaches a set number, the initial rotation signal Pi is generated.

The phase detectors discussed above with reference to FIG. 3, FIG. 4, FIG. 7 and FIG. 9 perform detection of in-phase degree by comparing the in-phase level between the sense signal $V_H$ and the compare signal CMP in one electrical cycle, i.e., by comparing the overlap that the sense signal $V_H$ and the compare signal CMP are both in the high level or both in the low level. However, one skilled in the art should realize that the in-phase degree may also be detected by comparing the degree of out of phase overlap between the sense signal $V_H$ and the compare signal CMP in one electrical cycle, i.e., by comparing the overlap that one signal between the sense signal $V_H$ and the compare signal CMP is in the high level, while the other signal between them is in the low level, as shown in FIG. 10.

Figure 10:
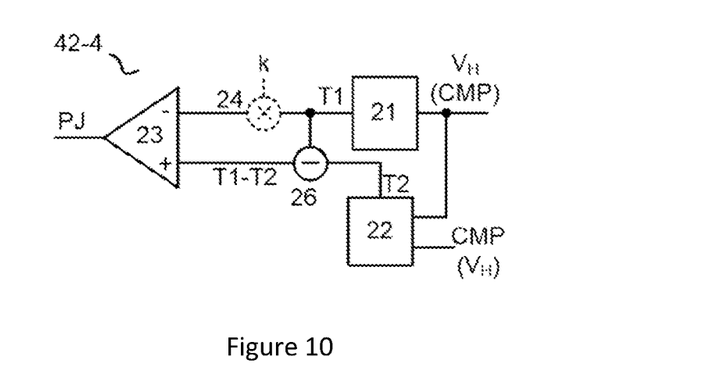
FIG. 10 schematically shows a circuit configuration of a phase detector 42-4 in accordance with an embodiment of the present invention.

FIG. 10 schematically shows a phase detector 42-4 in accordance with an embodiment of the present invention. In the example of FIG. 10, the phase detector 42-4 comprises: a first timer 21, a second timer 22, a subtractor 26, and a comparing unit 23. The first timer 21 is configured to time a time period of a high level or a low level of one signal between the sense signal $V_H$ and the compare signal CMP, to generate a first time signal T1. The second timer 22 is configured to time a time period of a complementary level of the other signal between the sense signal $V_H$ and the compare signal CMP during the timing period of the first timer 21, to generate a second time signal T2. The subtractor 26 is configured to perform a subtraction operation on the first time signal T1 and the second time signal T2, to generate an in-phase time signal T1-T2. The comparing unit 23 is configured to compare the first time signal T1 with the in-phase time signal T1-T2, to generate the initial rotation signal Pi.

In the example of FIG. 10, the phase detector 42-4 may further comprise a multiplying unit 24, configured to perform a multiplication operation on the first time signal T1 and the coefficient k. Then, the result of the multiplication is compared with the in-phase time signal T1-T2 at the comparing unit 23.

In the example of FIG. 10, the initial rotation signal Pi is generated by comparing the in-phase time signal T1-T2 with the first time signal T1 (or the multiplication of the first time signal T1 and the coefficient k). However, one skilled in the art should realize, the in-phase time signal T1-T2 may be compared with the first time signal T1 (or the multiplication of the first time signal T1 and the coefficient k) for several times in order to improve the detection accuracy, as shown in FIG. 11, which schematically shows a circuit configuration of a phase detector 42-5 in accordance with an embodiment of the present invention.

Figure 11:
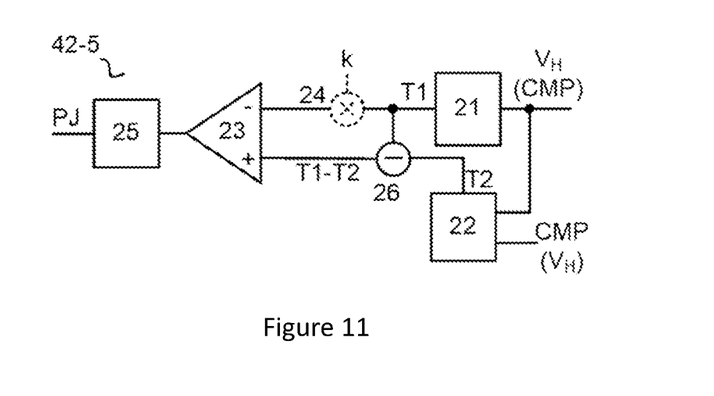
FIG. 11 schematically shows a circuit configuration of a phase detector 42-5 in accordance with an embodiment of the present invention.

The phase detector 42-5 shown in FIG. 11 is similar as the phase detector 42-4 in FIG. 10, with a difference that is in the example of FIG. 11, the phase detector 42-5 further comprises: a counting circuit 25, configured to start counting in response to a comparison result of the in-phase time signal T1-T2 with the first time signal T1 (or the multiplication of the first time signal T1 and the coefficient k). When the counting number reaches a set number, the initial rotation signal Pi is generated.

Figure 12:
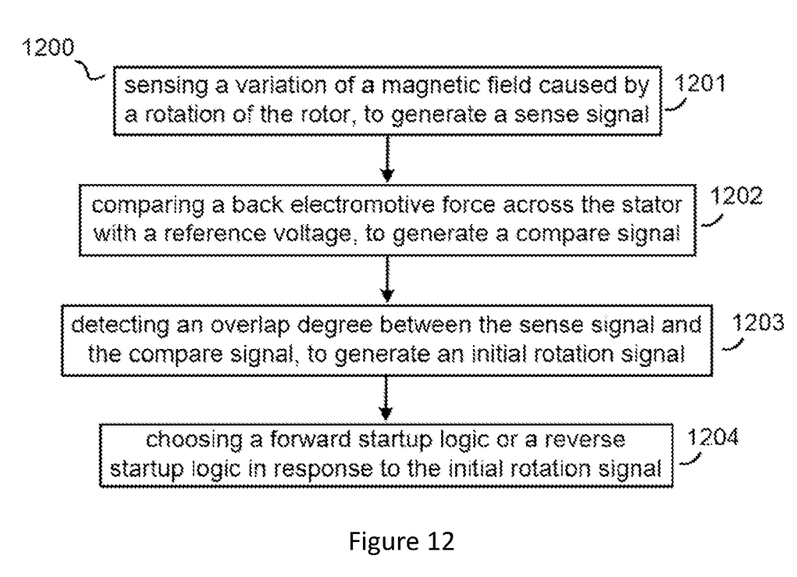
FIG. 12 schematically shows a flowchart 1200 of an initial rotation direction judging method used in a brushless DC motor in accordance with an embodiment of the present invention.

FIG. 12 schematically shows a flowchart 1200 of an initial rotation direction judging method used in a brushless DC motor in accordance with an embodiment of the present invention. The motor has a rotor and a stator. The method comprises:

Step 1201, sensing a variation of a magnetic field caused by a rotation of the rotor, to generate a sense signal.

Step 1202, comparing a back electromotive force across the stator with a reference voltage, to generate a compare signal.

Step 1203, detecting an overlap degree between the sense signal and the compare signal, to generate an initial rotation signal. And Step 1204, choosing a forward startup logic or a reverse startup logic in response to the initial rotation signal.

In one embodiment of the present invention, the step of "detecting an overlap degree between the sense signal and the compare signal" comprises: timing a first time period of a high level or a low level of one signal between the sense signal and the compare signal in one electrical cycle, to generate a first time signal; timing a second time period of the high level or the low level of the other signal between the sense signal and the compare signal during a timing period of the first time period, to generate a second time signal; and comparing the first time signal with the second time signal, or comparing a multiplication of the first time signal and a coefficient with the second time signal, to generate the initial rotation signal.

In one embodiment of the present invention, the step of "detecting an overlap degree between the sense signal and the compare signal" further comprises: comparing the first time signal (or the multiplication of the first time signal and the coefficient) with the second time signal for several times: if a number of times that the second time signal is higher than the first time signal (or the multiplication of the first time signal and the coefficient) reaches a set value, the motor has an initial forward rotation; and if the number of times that the second time signal is higher than the first time signal (or the multiplication of the first time signal and the coefficient) is less than the set value, the motor has an initial reverse rotation.

In one embodiment of the present invention, the step of "detecting an overlap degree between the sense signal and the compare signal" comprises: timing a first time period of a high level or a low level of one signal between the sense signal and the compare signal in one electrical cycle, to generate a first time signal; timing a second time period of a complementary level of the other signal between the sense signal and the compare signal during a timing period of the first time period, to generate a second time signal; performing a subtracting operation on the first time signal and the second time signal, to generate an in-phase time signal; and comparing the first time signal or a multiplication of the first time signal and a coefficient with the in-phase time signal, to generate the initial rotation signal.

In one embodiment of the present invention, the step of "detecting an overlap degree between the sense signal and the compare signal" further comprises: comparing the first time signal (or the multiplication of the first time signal and the coefficient) with the in-phase time signal for several times: if a number of times that the in-phase time signal is higher than the first time signal (or the multiplication of the first time signal and the coefficient) reaches a set value, indicating the motor has an initial forward rotation; and if the number of times that the in-phase time signal is higher than the first time signal (or the multiplication of the first time signal and the coefficient) is less than the set value, indicating the motor has an initial reverse rotation.

Several embodiments of the forgoing BLDC motor system judge the initial rotation direction through the back electromotive force generated by the stator together with the induced signal sensed by the hall sensor. Thus, startup performance of the motor is improved, the circuit wiring is simplified and the cost is lowered down.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A brushless DC motor system, comprising:
a power stage, configured to receive an input voltage, the power stage having power switches periodically turned on and off, to convert the input voltage to an energy required by a motor, the motor has a rotor and a stator;
a hall sensor, configured to sense a variation of a magnetic field caused by a rotation of the rotor, to generate a sense signal; and
a logical control circuit, having:
a comparing circuit, configured to compare a reference voltage with a feedback voltage indicative of a back electromotive force across the stator, to generate a compare signal;
a phase detector, configured to detect an overlap degree between the sense signal and the compare signal, to generate an initial rotation signal, wherein the overlap degree is larger than 0% and lower than 100%; and
a logic unit, configured to choose a forward rotation logic or a reverse rotation logic in response to the initial rotation signal, to control the operation of the power stage.

2. The motor system of claim 1, wherein the phase detector comprises:
a first timer, configured to time a time period of a high level of one signal between the sense signal and the compare signal in one electrical cycle, to generate a first time signal;

a second timer, configured to time a time period of a high level of the other signal between the sense signal and the compare signal during a timing period of the first timer, to generate a second time signal; and a comparing unit, configured to compare the second time signal with the first time signal or with a multiplication of the first time signal and a coefficient to generate the initial rotation signal.

3. The motor system of claim 2, wherein the phase detector further comprises:

a counting circuit, configured to start counting in response to a comparison result of the second time signal with the first time signal or with the multiplication of the first time signal and the coefficient; when a counting number reaches a set number, the initial rotation signal is generated.

4. The motor system of claim 1, wherein the phase detector comprises:

a first timer, configured to time a time period of a low level of one signal between the sense signal and the compare signal in one electrical cycle, to generate a first time signal;

a second timer, configured to time a time period of a low level of the other signal between the sense signal and the compare signal during a timing period of the first timer, to generate a second time signal; and a comparing unit, configured to compare the second time signal with the first time signal or with a multiplication of the first time signal and a coefficient to generate the initial rotation signal.

5. The motor system of claim 4, wherein the phase detector further comprises:

a counting circuit, configured to start counting in response to a comparison result of the second time signal with the first time signal or with the multiplication of the first time signal and the coefficient; when a counting number reaches a set number, the initial rotation signal is generated.

6. The motor system of claim 1, wherein the phase detector comprises:

a first timer, configured to time a time period of a high level or a low level of one signal between the sense signal and the compare signal in one electrical cycle, to generate a first time signal;

a second timer, configured to time a time period of a complementary level of the other signal between the sense signal and the compare signal during a timing period of the first timer, to generate a second time signal; and a comparing unit, configured to compare the second time signal with the first time signal or with a multiplication of the first time signal and a coefficient, to generate the initial rotation signal.

7. The motor system of claim 6, wherein the phase detector further comprises:

a counting circuit, configured to start counting in response to a comparison result of the second time signal with the first time signal or with the multiplication of the first time signal and the coefficient; when a counting number reaches a set number, the initial rotation signal is generated.

8. An initial rotation direction judging method used in a brushless DC motor system, the motor has a rotor and a stator, the method comprising:

sensing a variation of a magnetic field caused by a rotation of the rotor, to generate a sense signal;

comparing a back electromotive force across the stator with a reference voltage, to generate a compare signal;

detecting an overlap degree between the sense signal and the compare signal, to generate an initial rotation signal, wherein the overlap degree is larger than 0% and lower than 100%; and choosing a forward startup logic or a reverse startup logic in response to the initial rotation signal.

9. The method of claim 8, wherein the step of "detecting an overlap degree between the sense signal and the compare signal" comprises:

timing a first time period of a high level of one signal between the sense signal and the compare signal in one electrical cycle, to generate a first time signal;

timing a second time period of a high level of the other signal between the sense signal and the compare signal during a timing period of the first time period, to generate a second time signal; and comparing the first time signal with the second time signal, or comparing a multiplication of the first time signal and a coefficient with the second time signal, to generate the initial rotation signal.

10. The method of claim 9, wherein the step of "detecting an overlap degree between the sense signal and the compare signal" further comprises:

comparing the first time signal or the multiplication of the first time signal and the coefficient with the second time signal for several times: if a number of times that the second time signal is higher than the first time signal or the multiplication of the first time signal and the coefficient reaches a set value, indicating the motor has an initial forward rotation; and if the number of times that the second time signal is higher than the first time signal or the multiplication of the first time signal and the coefficient is less than the set value, indicating the motor has an initial reverse rotation.

11. The method of claim 8, wherein the step of "detecting an overlap degree between the sense signal and the compare signal" comprises:

timing a first time period of a low level of one signal between the sense signal and the compare signal in one electrical cycle, to generate a first time signal;

timing a second time period of a low level of the other signal between the sense signal and the compare signal during a timing period of the first time period, to generate a second time signal; and comparing the first time signal with the second time signal, or comparing a multiplication of the first time signal and a coefficient with the second time signal, to generate the initial rotation signal.

12. The method of claim 11, wherein the step of "detecting an overlap degree between the sense signal and the compare signal" further comprises:

comparing the first time signal or the multiplication of the first time signal and the coefficient with the second time signal for several times: if a number of times that the second time signal is higher than the first time signal or the multiplication of the first time signal and the coefficient reaches a set value, indicating the motor has an initial forward rotation; and if the number of times that the second time signal is higher than the first time signal or the multiplication of the first time signal and the coefficient is less than the set value, indicating the motor has an initial reverse rotation.

13. The method of claim 8, wherein the step of "detecting an overlap degree between the sense signal and the compare signal" comprises:

timing a first time period of a high level or a low level of one signal between the sense signal and the compare signal in one electrical cycle, to generate a first time signal;

timing a second time period of a complementary level of the other signal between the sense signal and the compare signal during a timing period of the first time period, to generate a second time signal;

performing a subtracting operation on the first time signal and the second time signal, to generate an in-phase time signal; and comparing the first time signal or a multiplication of the first time signal and a coefficient with the in-phase time signal, to generate the initial rotation signal.

14. The method of claim 13, wherein the step of "detecting an overlap degree between the sense signal and the compare signal" further comprises:

comparing the first time signal or the multiplication of the first time signal and the coefficient with the in-phase time signal for several times: if a number of times that the in-phase time signal is higher than the first time signal or the multiplication of the first time signal and the coefficient reaches a set value, indicating the motor has an initial forward rotation; and if the number of times that the in-phase time signal is higher than the first time signal or the multiplication of the first time signal and the coefficient is less than the set value, indicating the motor has an initial reverse rotation.

15. A logical control circuit used in a brushless DC motor system, the motor system having a power stage converting an input voltage to an output voltage, and a hall sensor configured to generate a sense signal by sensing a variation of a magnetic field caused by a rotation of a rotor, the logical control circuit comprising:

a comparing circuit, configured to compare a reference voltage with a feedback voltage indicative of a back electromotive force across a stator, to generate a compare signal;

a phase detector, configured to detect an overlap degree between the sense signal and the compare signal, to generate an initial rotation signal, wherein the overlap degree is larger than 0%, and is lower than 100%; and a logic unit, configured to choose a forward rotation logic or a reverse rotation logic in response to the initial rotation signal, to control the operation of the power stage.

16. The logical control circuit of claim 15, wherein the phase detector comprises:

a first timer, configured to time a time period of a high level of one signal between the sense signal and the compare signal in one electrical cycle, to generate a first time signal;

a second timer, configured to time a time period of a high level of the other signal between the sense signal and the compare signal during a timing period of the first timer, to generate a second time signal; and a comparing unit, configured to compare the second time signal with the first time signal or with a multiplication of the first time signal and a coefficient to generate the initial rotation signal.

17. The logical control circuit of claim 16, wherein the phase detector further comprises:

a counting circuit, configured to start counting in response to a comparison result of the second time signal with the first time signal or with the multiplication of the first time signal and the coefficient; when a counting number reaches a set number, the initial rotation signal is generated.

18. The logical control circuit of claim 15, wherein the phase detector comprises:

a first timer, configured to time a time period of a low level of one signal between the sense signal and the compare signal in one electrical cycle, to generate a first time signal;

a second timer, configured to time a time period of a low level of the other signal between the sense signal and the compare signal during a timing period of the first timer, to generate a second time signal; and a comparing unit, configured to compare the second time signal with the first time signal or with a multiplication of the first time signal and a coefficient to generate the initial rotation signal.

19. The logical control circuit of claim 18, wherein the phase detector further comprises:

a counting circuit, configured to start counting in response to a comparison result of the second time signal with the first time signal or with the multiplication of the first time signal and the coefficient; when a counting number reaches a set number, the initial rotation signal is generated.

20. The logical control circuit of claim 15, wherein the phase detector comprises:

a first timer, configured to time a time period of a high level or a low level of one signal between the sense signal and the compare signal in one electrical cycle, to generate a first time signal;

a second timer, configured to time a time period of a complementary level of the other signal between the sense signal and the compare signal during a timing period of the first timer, to generate a second time signal; and a comparing unit, configured to compare the second time signal with the first time signal or with a multiplication of the first time signal and a coefficient, to generate the initial rotation signal.

* * * * *